UNITED STATES PATENT OFFICE.

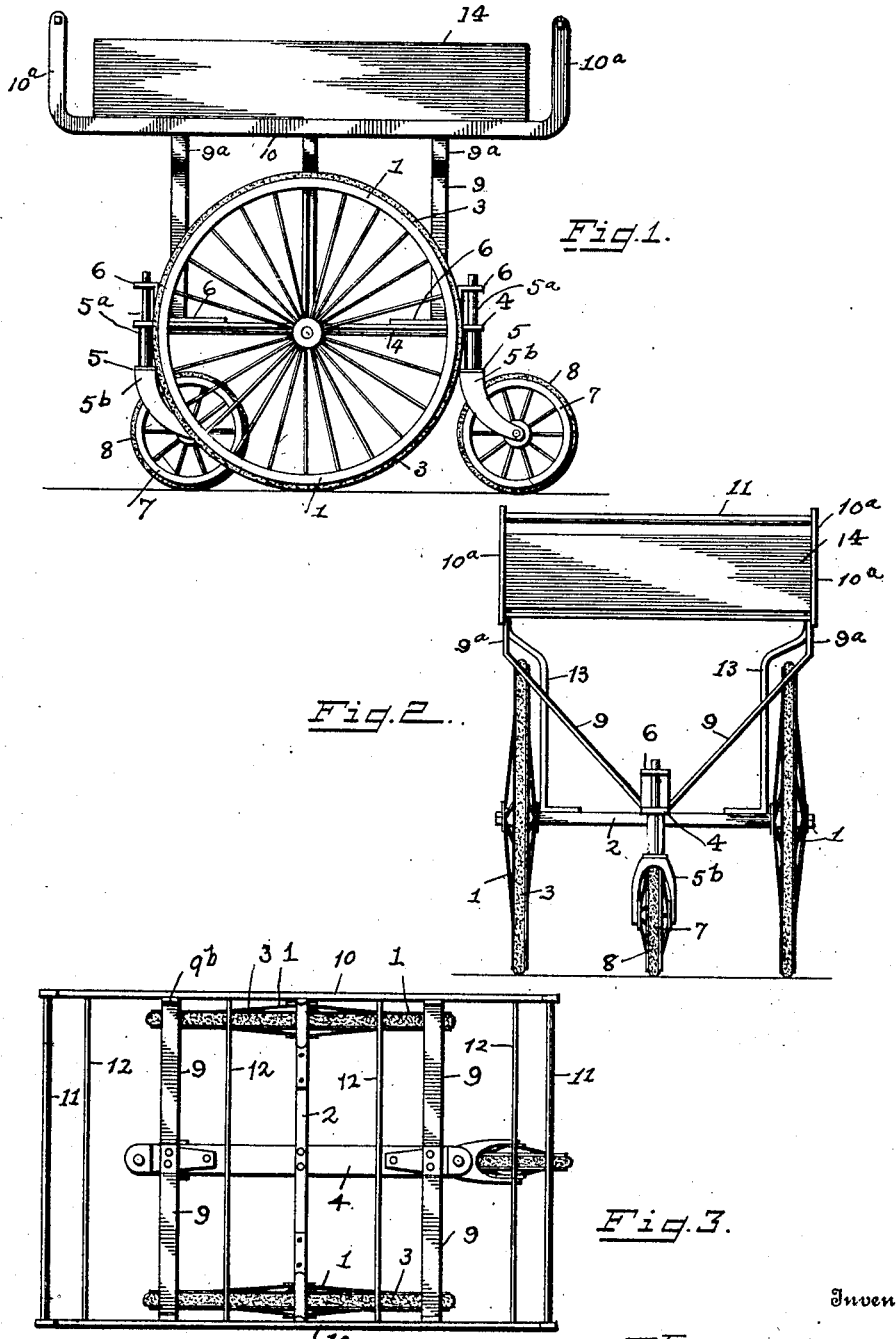

HENRY E. BOWN, OF COLUMBUS, OHIO.

TRUCK.

No. 913,943.

Specification of Letters Patent.

Patented March 2, 1909.

Application filed June 10, 1908. Serial No. 437,690.

*To all whom it may concern:*

Be it known that I, HENRY E. BOWN, a citizen of the United States, residing at Columbus, in the county of Franklin and State of Ohio, have invented certain new and useful Improvements in Trucks, of which the following is a specification.

My invention relates to the improvement of café trucks and the objects of my invention are to provide an improved truck of this class particularly adapted for use in the dining rooms of hotels, restaurants, club houses etc., for the purpose of conveying dishes and table utensils; to so construct my improved truck as to admit of the same being readily moved in any desired direction; to construct and arrange the parts of my device in such compact form as to occupy a comparatively small space and to produce other improvements the details of construction of which will be more fully pointed out hereinafter.

These objects I accomplish in the manner illustrated in the accompanying drawing, in which:

Figure 1 is a side elevation of my improved truck showing thereon a removable dish tray or box, Fig. 2 is a front elevation of the same, and, Fig. 3 is a plan view with the tray or dish receptacle removed.

Similar numerals refer to similar parts throughout the several views.

In carrying out my invention, I employ two comparatively large supporting wheels 1 which are rotatably mounted upon opposite ends of an axle 2. These ground wheels are provided with grooved peripheries or rims, in which grooves are mounted rubber tires 3. Secured to and extending at right angles with the axle is the central portion of a horizontal bar 4 which is arranged, as shown, midway between the wheels and the length of which is equal substantially to the diameters of said wheels. Each end of the bar 4 is formed with a vertical opening through which passes and which forms a rotary bearing for the vertical stem or shank $5^a$ of a caster fork or frame 5. From the bar 4 rises an angular bracket arm 6 which forms an additional upper bearing for the reduced upper portion of the caster shank $5^a$. Between the lower curved fork members $5^b$ of each of the caster frames, is journaled a small bearing and guide wheel 7, which wheels as prescribed for the wheels 1 are provided with rubber tires 8. From the outer end portions of the bar 4 extend upwardly and outwardly, the inclined members of a central bend or doubled bar 9. The upper portions of the bar members 9 are bent, as shown at $9^a$, to form vertical extensions, the latter being suitably secured to the inner sides of the parallel side bars 10 of a tray or box supporting frame. In the construction of said frame, the side bars 10 have their end portions bent vertically upward as indicated at $10^a$ and the upward extensions of one bar are connected with those of the opposite bar through the medium of transverse hand rods 11. The side bars 10 are further connected at desirable intervals by transverse connecting rods 12.

An additional support for the tray supporting frame is provided by the employment of upright bars 13, the lower end portions of which are secured to the upper sides of the axles adjoining the side wheel hubs and the upper outwardly bent end portions of which are secured to the inner sides of the side frame bars 10. Upon the truck thus constructed, is adapted to be removably supported an oblong tray or dish box such as is indicated at 14.

In the construction of my improved truck, I employ comparatively light metal frame pieces and in order to insure the easy running of both the large and small wheels, I preferably provide said wheels with ball bearings. It will be noted that both the side and end wheels of the truck, are arranged within a comparatively small space and that said wheels do not project beyond the tray supporting frame.

It is obvious that by grasping either of the handle rods 11, a truck such as herein described may be readily pushed to any desired position, the wheel arrangements thereof being such as to facilitate the turning of said truck within a comparatively small space, thereby facilitating the use of the truck between tables or in comparatively narrow passageways.

What I claim, is:

1. In a truck of the character described, the combination with the axle and side wheels mounted thereon, a frame bar crossing said axle, and wheel carrying caster frames pivotally carried by the ends of said frame bar, of supporting bars extending upward from said frame bar, and a tray supporting frame mounted horizontally on said supporting bars.

2. In a truck of the character described, the combination with the axle and side wheels mounted thereon, a frame bar crossing said axle, and wheel carrying caster frames pivotally carried by the ends of said frame bar, of supporting bars extending upward from said frame bar, and a tray supporting frame mounted horizontally on said supporting bars, said tray frame comprising connected horizontal side bars having upturned ends and hand rods extending between said ends.

In testimony whereof I affix my signature in presence of two witnesses.

HENRY E. BOWN.

Witnesses:
C. C. SHEPHERD,
L. CARL STOUGHTON.